United States Patent
O'Rear

(10) Patent No.: US 6,846,404 B2
(45) Date of Patent: Jan. 25, 2005

(54) REDUCING $CO_2$ LEVELS IN $CO_2$-RICH NATURAL GASES CONVERTED INTO LIQUID FUELS

(75) Inventor: Dennis J. O'Rear, Petaluma, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 243 days.

(21) Appl. No.: 10/118,029

(22) Filed: Apr. 9, 2002

(65) Prior Publication Data

US 2003/0191197 A1 Oct. 9, 2003

(51) Int. Cl.[7] .......................... C10G 35/00; C07C 27/00
(52) U.S. Cl. ................... 208/133; 208/134; 208/141; 585/14; 518/700; 518/704
(58) Field of Search .................. 208/133, 141, 208/134; 518/700, 704; 585/14

(56) References Cited

U.S. PATENT DOCUMENTS

| | | |
|---|---|---|
| 3,969,221 A | 7/1976 | Mitchell et al. |
| 4,108,244 A | 8/1978 | Cook et al. |
| 4,322,227 A | 3/1982 | Cook et al. |
| 4,617,320 A | 10/1986 | Coughlin et al. |
| 5,559,068 A | 9/1996 | Chen et al. |
| 5,714,657 A | 2/1998 | de Vries |
| 5,763,716 A | 6/1998 | Benham et al. |
| 6,043,288 A | 3/2000 | DeGeorge et al. |
| 6,103,773 A | 8/2000 | Wittenbrink et al. |
| 6,172,124 B1 | 1/2001 | Wolflick et al. |
| 6,187,465 B1 * | 2/2001 | Galloway ............... 429/17 |
| 6,310,108 B1 | 10/2001 | Bonneau et al. |
| 6,331,573 B1 | 12/2001 | Kibby |
| 6,534,552 B2 | 3/2003 | Benham et al. |
| 6,693,138 B2 * | 2/2004 | O'Rear ............... 518/700 |

FOREIGN PATENT DOCUMENTS

| | | |
|---|---|---|
| EP | 0112613 | 3/1991 |
| GB | 1006745 | 10/1965 |
| WO | WO 01/72674 A1 | 10/2001 |

OTHER PUBLICATIONS

Bechtel, "Refining and end use study of coal liquids", U.S. Dept of Energy Report, Pittsburg, May 1998.
Netherlands Search Report dated Apr. 27, 2004.
U.S. patent application No. 10/118,053, Dennis J. O'Rear, *Reduction of Carbon Dioxide Emissions from Fischer–Tropsch GTL Facilty by Aromatics Production*, filed on Apr. 9, 2002.
International Search Report dated Jul. 16, 2003.
International Search Report dated Aug. 27, 2003.

\* cited by examiner

*Primary Examiner*—Walter D. Griffin
*Assistant Examiner*—James Arnold, Jr.
(74) *Attorney, Agent, or Firm*—Burns, Doane, Swecker & Mathis, L.L.P.

(57) ABSTRACT

Provided is a process for converting $CO_2$-rich natural gas into liquid fuel. The process includes introducing a $CO_2$-rich natural gas feed stream into a synthesis gas formation reactor and then forming a synthesis gas. At least a portion of the synthesis gas is then introduced into a Fischer-Tropsch reactor. A Fischer-Tropsch process is conducted generating a Fischer-Tropsch product. A naphtha is separated from the Fischer-Tropsch product and introduced into a naphtha reformer. Hydrogen by-product is generated by reforming the naphtha to obtain a $C_6$–$C_{10}$ product having a hydrogen to carbon ratio less than about 2.0. At least a portion of the hydrogen by-product is recirculated and mixed with the $CO_2$-rich natural gas feed stream. The hydrogen by-product mixes with the $CO_2$-rich natural gas feed stream such that at least a portion of the $CO_2$ present in the natural gas feed stream is converted into additional CO by a reverse water gas shift reaction so that the synthesis gas derived from the feed stream contains a volume amount of $CO_2$ that is less than a volume amount of $CO_2$ present in the feed stream prior to mixing with the hydrogen by-product. Finally, the additional CO is converted into hydrocarbons in the Fischer-Tropsch reactor.

17 Claims, 2 Drawing Sheets

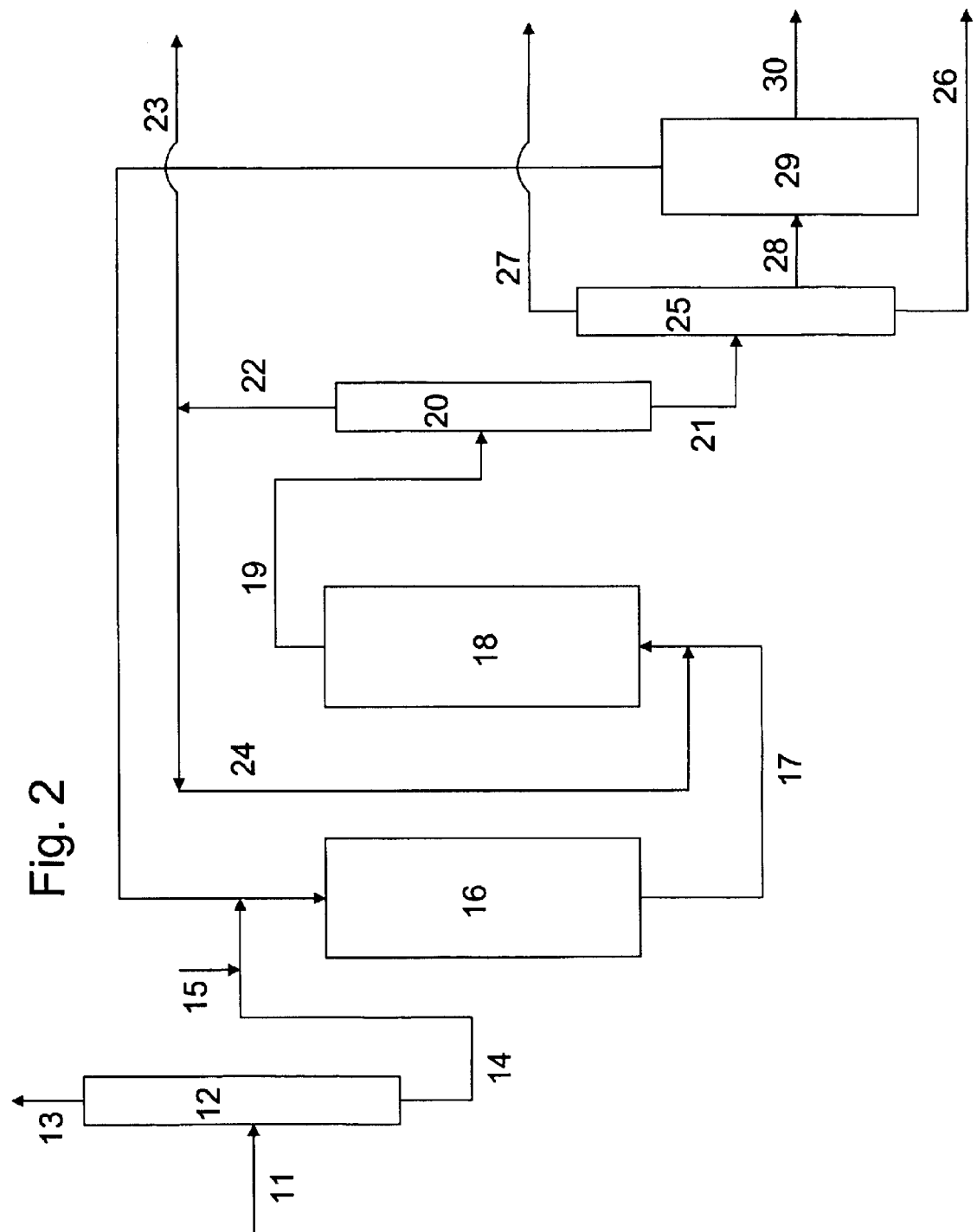

REDUCING CO$_2$ LEVELS IN CO$_2$-RICH NATURAL GASES CONVERTED INTO LIQUID FUELS

BACKGROUND OF THE INVENTION

1. Field of the Invention

The present invention is directed to the conversion of CO$_2$-rich natural gases into liquid fuels. In particular, the invention is directed to reducing CO$_2$ levels in CO$_2$-rich natural gases that are converted into liquid fuels.

2. Description of the Related Art

The conversion of remote natural gas assets into transportation fuels has become more desirable because of the need to exploit existing natural gas assets as a way to satisfy the increasing need for transportation fuels. Generally, the term "remote natural gas" refers to a natural gas asset that cannot be economically shipped to a commercial market by pipeline.

Conventionally, two approaches exist for converting remote natural gases into conventional transportation fuels and lubricants including, but not limited to, gasoline, diesel fuel, jet fuel, lube base stocks, and the like. The first approach comprises converting natural gas into synthesis gas by partial oxidation, followed by a Fischer-Tropsch process, and further refining resulting Fischer-Tropsch products. The second approach comprises converting natural gas into synthesis gas by partial oxidation, followed by methanol synthesis wherein the synthesized methanol is subsequently converted into highly aromatic gasoline by a Methanol To Gasoline (MTG) process. Both of these approaches use synthesis gas as an intermediate. Also, while other approaches exist for using natural gas in remote locations, such approaches do not produce conventional transportation fuels and lubricants, but instead produce other petroleum products including, but not limited to, liquified natural gas (LNG) and converted methanol.

The Fischer-Tropsch and MTG processes both have advantages and disadvantages. For instance, the Fischer-Tropsch process has the advantage of forming products that are highly paraffinic. Highly paraffinic products are desirable because they exhibit excellent combustion and lubricating properties. Unfortunately, a disadvantage of the Fischer-Tropsch process is that the Fischer-Tropsch process emits relatively large amounts of CO$_2$ during the conversion of natural gas assets into saleable products. An advantage of the MTG process is that the MTG process produces highly aromatic gasoline and LPG fractions (e.g., propane and butane). However, while highly aromatic gasoline produced by the MTG process is generally suitable for use in conventional gasoline engines, highly aromatic MTG gasoline may be prone to form durene and other polymethyl aromatics having high crystallization temperatures that form solids upon standing. In addition, the MTG process is more expensive than the Fischer-Tropsch process and the products produced by the MTG process cannot be used for lubricants, diesel engine fuels or jet turbine fuels.

Catalysts and conditions for performing Fischer-Tropsch reactions are well known to those of skill in the art, and are described, for example, in EP 0 921 184A1, the contents of which are hereby incorporated by reference in their entirety. A schematic of a conventional Fischer-Tropsch process is shown in FIG. 1. In FIG. 1, a natural gas feed stream 11 comprising CH$_4$ and CO$_2$, enters a first separator 12 wherein an amount of CO$_2$ is removed in an exit stream 13. A natural gas feed stream 14, comprising CH$_4$ and CO$_2$, exits the first separator 12 and mixes with a stream 15 of O$_2$ and H$_2$O. The feed stream 14 then enters a synthesis gas formation reactor 16. A synthesis gas stream 17, comprising CO, H$_2$ and CO$_2$, exits the synthesis gas formation reactor 16 and enters a Fischer-Tropsch reactor 18. A Fischer-Tropsch product stream 19 exits the Fischer-Tropsch reactor 18 and enters a second separator 20. The second separator 20 separates the Fischer-Tropsch product stream 19 into a hydrocarbon products stream 21, and an unreacted gas stream 22, comprising unreacted CO, H$_2$ and CO$_2$. The unreacted gas stream 22 either recirculates in a recirculation stream 24 that mixes with the synthesis gas stream 17 before the synthesis gas stream enters the Fischer-Tropsch reactor 18, or exits the process in an exit stream 23 where the unreacted gases are used as a fuel.

The Fischer-Tropsch process can be understood by examining the stoichiometry of the reaction that occurs during a Fischer-Tropsch process. For example, during Fischer-Tropsch processing, synthesis gas (i.e., a mixture including carbon monoxide and hydrogen), is generated, typically from at least one of three basic reactions. Typical Fischer-Tropsch reaction products include paraffins and olefins, generally represented by the formula nCH$_2$. While this formula accurately defines mono-olefin products, it only approximately defines C$_5^+$ paraffin products. The value of n (i.e., the average carbon number of the product) is determined by reaction conditions including, but not limited to, temperature, pressure, space rate, catalyst type and synthesis gas composition. The desired net synthesis gas stoichiometry for a Fischer-Tropsch reaction is independent of the average carbon number (n) of the product and is about 2.0, as determined by the following reaction equation:

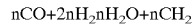

$$nCO + 2nH_2 \rightarrow nH_2O + nCH_2$$

where nCH$_2$ represents typical Fischer-Tropsch reaction products such as, for example, olefins and paraffins.

The three general reactions that produce synthesis gas from methane are as follows:

steam reforming of methane: CH$_4$+H$_2$O $\rightarrow$ CO+3H$_2$;
dry reforming, or reaction between CO$_2$ and methane: CH$_4$+CO$_2$ $\rightarrow$ 2CO+2 H$_2$; and
partial oxidation using oxygen: CH$_4$+½O$_2$ $\rightarrow$ CO+2H$_2$.

Although the above general reactions are the basic reactions used to produce synthesis gas, the ratio of hydrogen to carbon monoxide produced by the above reactions is not always adequate for the desired Fischer-Tropsch conversion ratio of 2.0. (In the present application all ratios are molar ratios, unless otherwise noted.) For example, in the steam reforming reaction, the resulting ratio of hydrogen to carbon monoxide is 3.0, which is higher than the desired hydrogen to carbon monoxide ratio of 2.0 for a Fischer-Tropsch conversion. Similarly, in the dry reforming reaction, the resulting hydrogen to carbon monoxide ratio is 1.0, which is lower than the desired hydrogen to carbon monoxide ratio of 2.0 for a Fischer-Tropsch conversion. In addition to exhibiting a hydrogen to carbon monoxide ratio that is lower than the desired ratio for a Fischer-Tropsch conversion, the above dry reforming reaction also suffers from problems associated with rapid carbon deposition. Finally, because the above partial oxidation reaction provides a hydrogen to carbon monoxide ratio of 2.0, the partial oxidation reaction is the preferred reaction for Fischer-Tropsch conversions.

In commercial practice, an amount of steam added to a partial oxidation reformer can control carbon formation. Likewise, certain amounts of CO$_2$ can be tolerated in the feed. Thus, even though partial oxidation is the preferred reaction for Fischer-Tropsch conversions, all of the above reactions can occur, to some extent, in an oxidation reformer.

It is also important to provide a low sulfur gas feedstock for the partial oxidation reformer. Typically, this can be done by use of an adsorption or absorption process or combination thereof. Suitable adsorbents can include, for example, water, amines, caustic compounds, combinations thereof and the like. Suitable adsorbents can include, for example, ZnO, Cu, Ni, combinations thereof and the like. ZnO is a preferred adsorbent because it selectively removes sulfur species without removing $CO_2$.

During partial oxidation, $CO_2$ forms because the reaction is not perfectly selective. That is, some amount of methane in the reaction will react with oxygen to form $CO_2$ by complete combustion. The reaction of methane with oxygen to form $CO_2$ is generally represented by the following reactions:

$$CH_4 + O_2 \rightarrow CO_2 + 2H_2$$

and $$CH_4 + 2O_2 \rightarrow CO_2 + 2H_2O.$$

Furthermore, steam added to the reformer to control coking, or steam produced during the Fischer-Tropsch reaction can react with CO to form $CO_2$ in a water gas shift reaction represented by the following general reaction:

$$CO + H_2O \rightarrow CO_2 + H_2.$$

Thus, invariably a significant amount of $CO_2$ is formed during the conversion of methane into transportation fuels and lubricants by the Fischer-Tropsch process. The $CO_2$ produced during the Fischer-Tropsch process exits the Fischer-Tropsch process in a tail gas exiting the Fischer-Tropsch unit. Tail gases exiting a Fischer-Tropsch process comprise any gases that remain unconsumed by the Fischer-Tropsch process.

The above equations represent general stoichiometric equations; they do not reflect an optimum synthesis gas composition for the kinetics or selectivity of a Fischer-Tropsch reaction. Moreover, depending on the nature of the Fischer-Tropsch catalyst, synthesis gas ratios other than 2.0, typically less than 2.0, are used to prepare the feed to a Fischer-Tropsch unit. However, because Fischer-Tropsch units typically produce products exhibiting a hydrogen to carbon monoxide ratio of about 2.0, the limiting reagent, typically $H_2$, is consumed first. The extra reagent, typically CO, is then recycled back to the Fischer-Tropsch unit for further conversion. Synthesis gas compositions having hydrogen to carbon monoxide ratios other than 2.0 are typically generated by recycling unused reagents.

Because $CO_2$ in the natural gas feedstock has a tendency to react in a dry reforming reaction, which suffers from the disadvantages of generating low hydrogen content synthesis gas and carbon deposits, only a limited amount of $CO_2$ can be tolerated in the synthesis gas. Typically, the amount of $CO_2$ in the synthesis gas must be limited to a few percent, preferably about 5 mol % or less. In instances where the synthesis gas comprises greater than 5 mol %, excess $CO_2$ must be removed from the synthesis gas and destroyed. Suitable $CO_2$ disposal methods include, but are not limited to, venting, injection into an underground reservoir, conversion to solid carbonates or injection into a body of water. Unfortunately, each of these methods suffer from disadvantages. First, venting is undesirable because it increases a facility's greenhouse gas emissions. Also, while injection into an underground reservoir and conversion into solid carbonates avoid additional greenhouse gas emissions, these methods are extremely costly. Finally, the injection of $CO_2$ into a body of water, using conventional methods wherein $CO_2$ is recovered at near atmospheric pressure, is both expensive and unproven.

As a result, there is an urgent need for a process that can convert $CO_2$-rich natural gases into liquid fuels while economically reducing the amount of $CO_2$ in the $CO_2$-rich natural gases.

SUMMARY OF THE INVENTION

The present invention satisfies the above objectives by providing a process that not only converts natural gas into liquid fuels, but also reduces $CO_2$ levels in the natural gases being converted.

More specifically, a process, according to the present invention, for converting $CO_2$-rich natural gas into liquid fuel includes introducing a $CO_2$-rich natural gas feed stream into a synthesis gas formation reactor and then forming a synthesis gas. At least a portion of the synthesis gas is then introduced into a Fischer-Tropsch reactor. A Fischer-Tropsch process is conducted generating a Fischer-Tropsch product. A naphtha is separated from the Fischer-Tropsch product and introduced into a naphtha reformer. Hydrogen by-product is generated by reforming the naphtha to obtain a $C_6$–$C_{10}$ product having a hydrogen to carbon ratio of less than about 2.0. At least a portion of the hydrogen by-product is recirculated and mixed with the $CO_2$-rich natural gas feed stream. The hydrogen by-product mixes with the $CO_2$-rich natural gas feedstream such that at least a portion of the $CO_2$ present in the $CO_2$-rich natural gas feed stream is converted into additional CO by a reverse water gas shift reaction so that the synthesis gas derived from the feed stream contains a volume amount of $CO_2$ that is less than a volume amount of $CO_2$ present in the feed stream prior to mixing with the hydrogen by-product. Finally, the additional CO is converted into hydrocarbons in the Fischer-Tropsch reactor.

The present invention also provides a process for using the $CO_2$ in natural gas for preparing hydrocarbons. Such a process, according to the present invention, includes reforming a Fischer-Tropsch naphtha to obtain a $C_6$–$C_{10}$ product and a hydrogen by-product. The process further includes reacting the hydrogen by-product with the $CO_2$ in a natural gas so that a reverse water gas shift reaction occurs converting the $CO_2$ into additional CO. The CO is then converted into hydrocarbons in a Fischer-Tropsch reactor. It is most preferred that the process is integrated so that the natural gas containing the $CO_2$ is used to create synthesis gas, from which the Fischer-Tropsch naphtha is prepared. This process thereby reduces the level of $CO_2$ in the natural gas while also making use of the generally inert $CO_2$ to obtain a valuable product, all preferably in an integrated process.

Thus, in general, the present invention reduces $CO_2$ levels in $CO_2$-rich natural gases, including natural gases being converted into liquid fuel, by converting at least a portion of the $CO_2$ present in a natural gas into additional CO with subsequent conversion of the additional CO into hydrocarbons. The process of the present invention reduces $CO_2$ levels in natural gases by reacting hydrogen by-product, generated from Fischer-Tropsch naphtha reformation, with $CO_2$ in a reverse water gas shift reaction to convert $CO_2$ into additional CO, and then converting the additional CO into hydrocarbons in a Fischer-Tropsch reactor. Thus, one advantage of the present invention is that it avoids producing low-hydrogen-content synthesis gases and carbon deposits, often resulting from the dry reformation of excess $CO_2$ present in a natural gas, without having to employ costly, ineffective or environmentally hazardous $CO_2$ disposal techniques.

BRIEF DESCRIPTION OF THE FIGURES OF THE DRAWING

FIG. 2 is a schematic view of a preferred embodiment of a Fischer-Tropsch process according to the present invention.

DETAILED DESCRIPTION OF THE PREFERRED EMBODIMENTS

Figure 1:
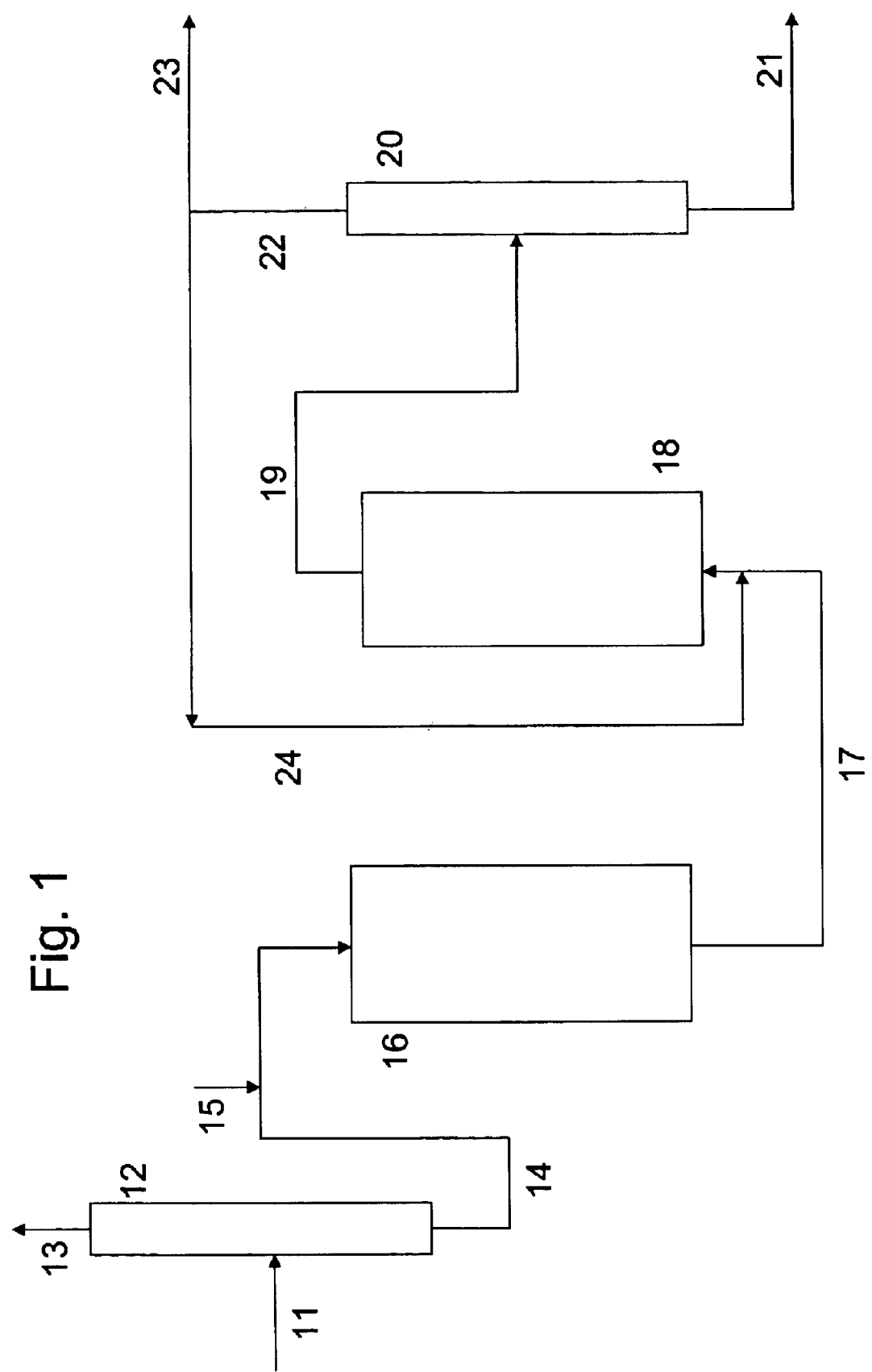
FIG. 1 is a schematic view of a conventional Fischer-Tropsch process.

In the present invention at least a portion of $CO_2$ present in a $CO_2$-rich natural gas feed stream is converted into additional CO that is subsequently converted into additional hydrocarbons. As used in the present application, the term "$CO_2$-rich" is intended to refer to a gas comprising at least about 1 mole percent $CO_2$, preferably at least 2 mole percent $CO_2$, more preferably at least about 5 mole percent $CO_2$ and most preferably at least about 10 mole percent $CO_2$. The conversion of $CO_2$ into additional CO requires an additional hydrogen source so that a reverse water gas shift reaction can occur. A suitable reverse water gas shift reaction, according to the present invention, is represented by the following general reaction:

$$CO_2 + H_2 \to CO + H_2O.$$

The hydrogen for the above reverse water gas shift reaction can be generated, for example, by converting at least a portion of a $C_5^+$ Fischer-Tropsch product into aromatics to form hydrogen by-product. A typical $C_8$ paraffin reaction that demonstrates how hydrogen by-product can be generated by converting a Fischer-Tropsch product into aromatics is as follows:

$$C_8H_{18} \to C_8H_{10} + 4H_2.$$

Processes for converting paraffin-rich streams into aromatics are well known in the field. Commonly, such conversion processes are referred to as "naphtha reforming processes," and are divided into two classes. The first class of naphtha reforming processes are referred to as conventional reforming processes and use a catalyst comprising at least one of Pt, alumina, and a halogen (typically Cl), Re, Ir, combinations thereof and the like. The catalyst in conventional reforming processes is typically exposed to sulfur before being employed in the reaction. Those of ordinary skill in the art commonly expose conventional reforming catalysts to sulfur prior to use in a reforming reaction in order to obtain highly selective conversion of $C_8$ to $C_{10}$ paraffins into aromatics. The second class of naphtha reforming processes are referred to as "non-acidic zeolitic reforming" processes, such as, for example, AROMAX® reforming processes. Non-acidic zeolitic reforming processes use a catalyst comprising at least one of Pt, a non-acidic zeolitic, typically an L-type zeolite, K, Ba, combinations thereof and the like. Generally, non-acidic zeolitic reforming catalysts are not exposed to sulfur prior to operation. In addition, non-acidic zeolitic reforming catalysts are highly selective for the conversion of hexane and heptane in aromatics.

The present invention can employ either or both of the above naphtha reforming processes. Aromatic products produced by the above reforming processes can be used in various applications. Suitable applications for such aromatic products include, but are not limited to, high octane blend components for gasoline, benzene for use as a chemical, especially for the production of cyclohexane, ethylbenzene and/or cumene, toluene for use as a chemical and xylene for use as a chemical, especially for the production of paraxylene. In a separate embodiment hydrogen can also be provided from alternative sources to supplement or replace hydrogen generated during naphtha reforming.

The removal of hydrogen from Fischer-Tropsch products causes the net $C_5^+$ Fischer-Tropsch-derived product to exhibit a lower hydrogen to carbon stoichiometric ratio. That is, even though the initial hydrogen to carbon ratio of the free synthesis gas is about 2.0, after conversion of a portion of the Fischer-Tropsch product into aromatics, the hydrogen to carbon stoichiometric ratio of the $C_5^+$ product declines to a value less than about 2.0, preferably less than about 1.95, and most preferably less than about 1.90. Further, the $C_6$–$C_{10}$ stream generally contains a lower amount of hydrogen than heavier product streams. This is advantageous because it is most preferable to make aromatics from a $C_6$–$C_{10}$ portion of the product. Preferably, the $C_6$–$C_{10}$ portion of the $C_5^+$ hydrocarbon product will exhibit a lower hydrogen to carbon ratio than a hydrogen to carbon ratio of a $C_{10}^+$ portion of the product. In embodiments, the $C_6$–$C_{10}$ portion of the $C_5^+$ hydrocarbon product will exhibit a hydrogen to carbon molar ratio that is preferably about 0.1 unit less, more preferably about 0.2 unit less, and most preferably about 0.25 unit less than the hydrogen to carbon ratio of the $C_{10}^+$ portion of the product. At least a portion of the hydrogen from the formation of aromatics is used to react with at least a portion of the $CO_2$ present in the $CO_2$-rich natural gas feed stream. The separation of $CO_2$ from other gases is well known in the industry and can be accomplished using any adsorbent or absorbent conventionally used to selectively separate $CO_2$. Most commonly, basic liquid amines are used to separate $CO_2$ from other gases but aqueous solutions of alkali metals with little or no amines can be used when the use of amines is undesirable.

The $CO_2$ in the $CO_2$-rich natural gas feed stream can be converted into additional CO by reacting the natural gas feed stream with hydrogen by-product so that the synthesis gas derived from the feed stream contains a volume amount of $CO_2$ that is less than a volume amount of $CO_2$ present in the feed stream prior to reacting with the hydrogen by-product. The natural gas feed can either be reacted with hydrogen by-product in a separate reactor before entering the synthesis gas formation reactor, or both the hydrogen by-product and the natural gas feed can be fed into the synthesis gas reactor. The latter is more preferable because it is less costly than reacting in a separate reactor. The synthesis gas, generated from the $CO_2$-rich natural gas after reaction with the hydrogen by-product, preferably contains about 5 mol % or less of $CO_2$.

Hydrogen produced in the naphtha reforming process often contains significant amounts of $C_2+$ hydrocarbons. These can cause coking in the methane reforming reactor, so it is preferable to process the hydrogen from the naphtha reforming reactor in a pre-reformer ahead of the main naphtha reformer. Likewise if there are significant $C_2+$ hydrocarbons in the methane feed to the reformer, it too should be processed in the pre-reformer. The purpose of the pre-reformer is to convert $C_2+$ hydrocarbons into syngas, methane, and water and to thereby avoid the coking that would otherwise occur. A typical pre-reforming process is disclosed, for example, in U.S. Pat. No. 6,114,400, the entire disclosure of which is incorporated herein by reference for all purposes. Staged steam-methane reforming processes utilizing a pre-reformer typically includes an adiabatic pre-reforming reactor containing a highly active nickel catalyst, to reform heavier hydrocarbons in the feedstock (and a portion of the methane, if present) to yield a mixture of methane, hydrogen, carbon monoxide, carbon dioxide, and steam. This pre-reforming product is then further processed in a reformer to produce a raw synthesis gas product.

Another type of staged reformer process utilizes a gas heated reformer (GHR) followed by an autothermal reformer. The GHR is a type of heat exchange reformer in which the hot raw synthesis gas from the autothermal reformer furnishes the heat for the first reforming stage in the GHR.

The hydrogen to carbon stoichiometric ratio of the resulting products can be determined by any number of methods including, but not limited to, chemical analysis such as Carlo-Erba combustion, Orsat chemical analysis, gas chromatography for identifying individual species, simple gas density, and NMR spectroscopy, combinations thereof, and the like. Generally, simple chemical analysis is preferred in order to minimize cost and to provide an accurate analysis.

The product streams in the present invention are Fischer-Tropsch-derived products generally in the ranges of $C_1$–$C_5$, naphtha and $C_{10}$+, wherein each of the general ranges may comprise more than one product stream. For example, each product stream can be a mixture, such as a synthetic crude, or may be individual streams such as LPG ($C_3$'s and $C_4$'s) condensates ($C_5$'s and $C_6$'s), high octane blend components ($C_6$–$C_{10}$ aromatic containing streams), jet fuel, diesel fuel, other distillate fuels, and lube blend stocks or lube blend stock feedstocks. Desired stoichiometric ratios specified in the present invention refer to the net product analysis. The $C_6$–$C_{10}$ naphtha product may be further described as "aromatic containing" meaning that the aromatic content is at least about 2 wt. %, preferably at least about 10 wt. % and most preferably at least about 25 wt. %, with analysis being done by GC or GC-MS.

In addition, the hydrogen by-product generated during naphtha reforming can also be used for other processes, such as hydrotreating a portion of the $C_5^+$ product to remove olefins, oxygenates and other trace heteroatoms.

Also, although recovered hydrogen from synthesis gases has been used for purposes including hydrotreating and catalyst regeneration, as described, for example, in U.S. Pat. Nos. 6,043,288 and 6,103,773, until now no one has recovered hydrogen generated during naphtha reforming for the purpose of reducing $CO_2$ levels in $CO_2$-rich natural gas feed streams.

A preferred embodiment of the present invention is depicted in FIG. 2. In this embodiment a $CO_2$-rich natural gas feed stream 11 comprising $CH_4$ and $CO_2$, enters a first separator 12 wherein an amount of $CO_2$ is removed in an exit stream 13. While the embodiment in FIG. 2 is depicted as including a first separator 12, it is also suitable to use a liquid adsorber (not shown) using a solution including water, caustic amines, combinations thereof and the like. In addition to removing $CO_2$, such a liquid adsorber would also remove as much sulfur as possible.

A natural gas feed stream 14, comprising $CH_4$ and $CO_2$, exits the first separator 12 and mixes with a stream 15 of $O_2$ and $H_2O$. The feed stream 14 then enters a synthesis gas formation reactor 16. Although the natural gas feed stream 14 is depicted as mixing with stream 15 before entering the reactor 16, it is equally suitable for the natural gas feed stream 14 to mix with the $O_2$- and $H_2O$-containing stream 15 after entering the reactor 16. Reactor 16 may contain a pre-reforming section to convert $C_2$+ hydrocarbons. A description of a pre-reformer and its use in the present process is described in U.S. Pat. No. 6,693,138, the entire disclosure of which is incorporated herein by reference for all purposes. A synthesis gas stream 17, comprising CO, $H_2$ and $CO_2$, exits the synthesis gas formation reactor 16 and enters a Fischer-Tropsch reactor 18. Additionally, water can be removed, for example, by condensation using equipment not shown.

A Fischer-Tropsch product stream 19 exits the Fischer-Tropsch reactor 18 and enters a second separator 20. The second separator 20 separates the Fischer-Tropsch product stream 19 into a hydrocarbon products stream 21, and an unreacted gas stream 22, comprising unreacted CO, $H_2$ and $CO_2$. Second separator 20 is shown as a separate vessel from Fischer-Tropsch reactor 18. In an alternative embodiment, the separation of the Fischer-Tropsch product stream 19 may also be conducted within Fischer-Tropsch reactor 18, so that second separator 20 is an integral part, or coincident with, Fischer-Tropsch reactor 18. Hydrocarbon product stream 21 is a $C_1$+ stream, indicating that the stream contains a range of hydrocarbon products. $C_1$ hydrocarbons are generally present, but are not required. The $C_5$+ components (i.e. those hydrocarbons having carbon numbers of 5 and higher) of the hydrocarbon products may be separated into a naphtha stream 28 and a $C_{10}$+ product stream 26. The unreacted gas stream 22 either recirculates in a recirculation stream 24 that mixes with the synthesis gas stream 17 before the synthesis gas stream enters the Fischer-Tropsch reactor 18, or exits the process in an exit stream 23 where the unreacted gases are used as a fuel. The hydrocarbon products stream 21 exits the second separator 20 and enters a third separator 25. The third separator 25 separates the hydrocarbon products stream 21 into a $C_1$–$C_5$ product stream 27, wherein the $C_1$–$C_5$ product has a hydrogen to carbon ratio of at least about 2.0, a naphtha stream 28 and a $C_{10}^+$ product stream 26, wherein the $C_{10}^+$ product has a hydrogen to carbon ratio of about 2.0. Water produced in the Fischer Tropsch reaction is also removed in this separation stage.

The naphtha stream 28 enters a naphtha reformer 29. It is important to note that the sulfur content of mixed gas being fed to the reformer 29 should be about 1 ppm or less. If sulfur removal is needed, it can be performed using equipment (not shown) such as, for example, adsorbent beds employing selective $H_2S$ liquid adsorption systems and solid adsorbents typically using ZnO. ZnO adsorption is preferred because it can selectively remove sulfur without removing a substantial amount of $CO_2$. The naphtha reformer 29 reforms the naphtha stream 28 generating a $C_6$–$C_{10}$ product stream 30, wherein the $C_6$–$C_{10}$ product has a hydrogen to carbon ratio of less than about 2.0, and a hydrogen by-product stream 31. The $C_6$–$C_{10}$ product can be described as "aromatic containing" meaning that the aromatic content is at least about 2 wt. %, preferably at least about 10 wt. % and most preferably at least about 25 wt. %, with analysis being done by GC or GC-MS.

The hydrogen by-product stream 31 recirculates so that the hydrogen by-product reacts with $CO_2$ present in the natural gas feed stream 14 before the feed stream 14 enters the synthesis gas formation reactor 16. Although the hydrogen by-product stream 31 is depicted as mixing with the feed stream 14 before entering the synthesis gas formation reactor 16, the hydrogen by-product stream 31 can also mix with the feed stream 14 during and/or after the feed stream 14 enters the formation reactor 16 instead of, or in addition to mixing with the feed stream 14 before entering the synthesis gas formation reactor 16. The hydrogen in the hydrogen by-product stream 31 reacts with $CO_2$ in the natural gas product stream 14 in a reverse water gas shift reaction to prepare additional CO, which is then converted into additional hydrocarbons. Accordingly, the volume amount of CO₂ in the synthesis gas stream 17 exiting synthesis gas formation reactor 16 is substantially less than the volume amount of CO₂ in the natural gas feed stream 14 prior to mixing with the hydrogen by-product stream 13.

While the present invention has been described with reference to specific embodiments, this application is intended to cover those various changes and substitutions that may be made by those of ordinary skill in the art without departing from the spirit and scope of the appended claims.

What is claimed is:

1. A process for converting $CO_2$-rich natural gas into liquid fuel, the process comprising:
   a) introducing a $CO_2$-rich natural gas feed stream into a synthesis gas formation reactor;
   b) forming a synthesis gas in the synthesis gas formation reactor;
   c) introducing at least a portion of the synthesis gas into a Fischer-Tropsch reactor;
   d) conducting a Fischer-Tropsch process on the synthesis gas and generating a Fischer-Tropsch product comprising $C_5+$ components;
   e) separating a naphtha from the Fischer-Tropsch product and recovering a $C_{10}+$ product;
   f) introducing the naphtha into a naphtha reformer;
   g) generating hydrogen by-product by reforming the naphtha to obtain a $C_6-C_{10}$ product having a hydrogen to carbon ratio of less than about 2.0;
   h) recirculating at least a portion of the hydrogen by-product and mixing the hydrogen by-product with the $CO_2$-rich natural gas feed stream, converting at least a portion of the $CO_2$ present in the $CO_2$-rich natural gas feed stream into additional CO by a reverse water gas shift reaction so that the synthesis gas derived from the feed stream contains a volume amount of $CO_2$ that is less than a volume amount of $CO_2$ present in the feed stream prior to mixing with the hydrogen by-product; and
   i) converting the additional CO into hydrocarbons in the Fischer-Tropsch reactor.

2. The process of claim 1, further comprising separating the Fischer-Tropsch product into at least unreacted gases comprising CO $H_2$ and $CO_2$, the naphtha and a $C_{10}^+$ product, the $C_{10}^+$ product having a hydrogen to carbon ratio of about 2.0.

3. The process of claim 2, further comprising recirculating at least a portion of the unreacted gases so that the unreacted gases mix with the synthesis gas before the synthesis gas enters the Fischer-Tropsch reactor.

4. The process of claim 1, wherein the $C_6-C_{10}$ product has a hydrogen to carbon ratio that is less than about 1.95.

5. The process of claim 1, wherein the $C_6-C_{10}$ product has a hydrogen to carbon ratio that is less than about 1.90.

6. The process of claim 1, wherein the $C_6-C_{10}$ product has a lower hydrogen to carbon ratio than the $C_{10}^+$ product.

7. A process for converting $CO_2$ in a natural gas to hydrocarbons, the process comprising:
   a) reforming a Fischer-Tropsch naphtha to obtain a $C_6-C_{10}$ product and a hydrogen by-product;
   b) reacting the hydrogen by-product with $CO_2$ in a natural gas feed stream being fed into a synthesis gas formation reactor to produce a synthesis gas used to obtain the Fischer-Tropsch naphtha, so that a reverse water gas shift reaction occurs converting the $CO_2$ into additional CO; and
   c) converting the additional CO into hydrocarbons in a Fischer-Tropsch reactor, so that a volume amount of $CO_2$ in the synthesis gas is less than a volume amount of $CO_2$ present in the natural gas feed stream prior to reacting with the hydrogen by-product.

8. The process of claim 7, wherein the amount of $CO_2$ is reduced so that the amount of $CO_2$ in the synthesis gas, derived from the natural gas feed stream and used to obtain the Fischer-Tropsch naphtha, is about 10 mol % or less.

9. The process of claim 7, wherein the amount of $CO_2$ is reduced so that the amount of $CO_2$ in the synthesis gas, derived from the natural gas feed stream and used to obtain the Fischer-Tropsch naphtha, is about 7 mol % or less.

10. The process of claim 7, wherein the amount of $CO_2$ is reduced so that the amount of $CO_2$ in the synthesis gas, derived from the natural gas feed stream and used to obtain the Fischer-Tropsch naphtha, is about 5 mol % or less.

11. The process of claim 7, wherein said $C_6-C_{10}$ product has a hydrogen to carbon ratio of less than about 2.0.

12. A process for converting a natural gas into liquid fuel, the process comprising:
   a) introducing a natural gas feed stream comprising $CO_2$ and $CH_4$ into a synthesis gas formation reactor;
   b) generating a synthesis gas comprising CO, $H_2$ and $CO_2$ in the synthesis gas formation reactor;
   c) introducing the synthesis gas into a Fischer-Tropsch reactor;
   d) performing a Fischer-Tropsch process on the synthesis gas to produce a Fischer-Tropsch product;
   e) separating the Fischer-Tropsch product into unreacted CO, $H_2$ and $CO_2$, a $C_1-C_5$ product having a hydrogen to carbon ratio of about 2.0, a naphtha, and a $C_{10}^+$ product, the $C_{10}^+$ product having a hydrogen to carbon ratio of about 2.0;
   f) reforming the naphtha to generate hydrogen by-product and $C_6-C_{10}$ product with a hydrogen to carbon ratio of less than about 2.0; and
   g) mixing the hydrogen by-product with the natural gas feed stream so that at least a portion of the $CO_2$ present in the natural gas feed stream is converted into additional CO by a reverse water gas shift reaction so that the synthesis gas derived from the feed stream contains a volume amount of $C_2$ that is less than a volume amount of $CO_2$ present in the natural gas feed stream prior to being mixed with the hydrogen by-product; and
   h) converting the additional CO into hydrocarbons in the Fischer-Tropsch reactor.

13. A process for converting $CO_2$ in a natural gas to hydrocarbons, the process comprising:
   a) generating hydrogen by-product by reforming a Fischer-Tropsch naphtha using at least one of a conventional naphtha reforming reaction and a non-acidic zeolitic reforming reaction to obtain a $C_6-C_{10}$ product having a hydrogen to carbon ratio of less than about 2.0;
   b) reacting the hydrogen by-product with $C_2$ in a natural gas feed stream being used to obtain a synthesis gas used to obtain the Fischer-Tropsch naphtha, so that a reverse water gas shift reaction occurs converting the $CO_2$ into additional CO; and
   c) converting the additional CO into hydrocarbons in a Fischer-Tropsch reactor, so that a volume amount of $CO_2$ in the synthesis gas used to obtain the Fischer-Tropsch naphtha is less than a volume amount of $CO_2$ in the natural gas feed stream prior to reacting with the hydrogen by-product.

14. A process for reducing an amount of $CO_2$ present in a natural gas feed stream, the process comprising:

a) introducing a natural gas feed stream comprising $CH_4$ and $CO_2$ into a synthesis gas formation reactor, b) forming a synthesis gas comprising CO, $H_2$ and $CO_2$ in the synthesis gas formation reactor;

c) introducing at least a portion of the synthesis gas into a Fischer-Tropsch reactor;

d) performing a Fischer-Tropsch process on the synthesis gas to obtain a Fischer-Tropsch product;

e) introducing the Fischer-Tropsch product into a first separator and separating unreacted gases, comprising CO, $H_2$ and $CO_2$, and hydrocarbon products, from the Fischer-Tropsch product;

f) feeding at least a portion of the unreacted gases into the synthesis gas being fed into the Fischer-Tropsch reactor;

g) separating the hydrocarbon products from the Fischer-Tropsch reactor into a $C_1$–$C_5$ product having a hydrogen to carbon ratio of at least about 2.0, a naphtha and a $C_{10}^+$ product, the $C_{10}^+$ product having a hydrogen to carbon ratio of about 2.0;

h) introducing the naphtha into a naphtha reformer;

i) generating hydrogen by-product by reforming the naphtha in the reformer to produce a $C_6$–$C_{10}$ product with a hydrogen to carbon ratio of less than about 2.0; and j) recirculating the hydrogen by-product so that the hydrogen by-product mixes with the natural gas feed stream so that the hydrogen by-product reacts with at least a portion of the $CO_2$ present in the feed stream so that the $CO_2$ is converted into additional CO by a reverse water gas shift reaction so that the synthesis gas derived from the feed stream contains a volume amount of $CO_2$ that is less than a volume amount of $CO_2$ present in the feed stream prior to mixing with the hydrogen by-product; and k) converting the additional CO into hydrocarbons in the Fischer-Tropsch reactor.

15. A process for using $CO_2$ in a natural gas to prepare hydrocarbons, the process comprising:

a) reforming a Fischer-Tropsch naphtha using at least one of a conventional naphtha reforming reaction or a non-acidic zeolitic reforming reaction to obtain a $C_6$–$C_{10}$ product having a hydrogen to carbon ratio of less than about 2.0 and hydrogen by-product, and b) reacting the hydrogen by-product with $CO_2$ in a natural gas so that a reverse water gas shift reaction occurs converting the $CO_2$ into CO; and c) converting the CO into hydrocarbons in a Fischer-Tropsch reactor.

16. The process of claim 15, wherein the Fischer-Tropsch naphtha is derived from a synthesis gas obtained from the natural gas.

17. The process of claim 16, wherein a volume amount of $CO_2$ in the synthesis gas used to produce the Fischer-Tropsch naphtha is less than a volume amount of $CO_2$ present in the natural gas prior to reacting with the hydrogen by-product.

* * * * *

UNITED STATES PATENT AND TRADEMARK OFFICE
CERTIFICATE OF CORRECTION

PATENT NO. : 6,846,404 B2
DATED : January 25, 2005
INVENTOR(S) : Dennis J. O'Rear It is certified that error appears in the above-identified patent and that said Letters Patent is hereby corrected as shown below:

<u>Column 9,</u>
Line 42, please insert a comma -- , -- between "CO" and "$H_2$".

<u>Column 10,</u>
Lines 41 and 55, please delete "$C_2$" and insert -- $CO_2$ -- in place thereof.

<u>Column 11,</u>
Line 2, please delete the comma "," and insert a semi colon -- ; -- in place thereof.

Signed and Sealed this

Seventh Day of June, 2005

JON W. DUDAS
*Director of the United States Patent and Trademark Office*